United States Patent
Son et al.

(10) Patent No.: US 8,331,317 B2
(45) Date of Patent: Dec. 11, 2012

(54) APPARATUS AND METHOD FOR REDUCING HANDOVER DELAY IN BROADBAND WIRELESS COMMUNICATION SYSTEM

(75) Inventors: Jung-Je Son, Yongin-si (KR); Jae-Hyuk Jang, Suwon-si (KR); Jong-Hyung Kwun, Seongnam-si (KR); Young-Hyun Jeon, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 601 days.

(21) Appl. No.: 12/389,824

(22) Filed: Feb. 20, 2009

(65) Prior Publication Data

US 2009/0207809 A1   Aug. 20, 2009

(30) Foreign Application Priority Data

Feb. 20, 2008 (KR) .................. 10-2008-0015180

(51) Int. Cl.
*H04W 36/00* (2009.01)
(52) U.S. Cl. ....................... 370/331; 455/437
(58) Field of Classification Search .................. None
See application file for complete search history.

(56) References Cited

U.S. PATENT DOCUMENTS

| | | | |
|---|---|---|---|
| 2004/0176094 A1* | 9/2004 | Kim et al. | 455/438 |
| 2008/0159231 A1* | 7/2008 | Kim et al. | 370/331 |
| 2009/0143089 A1* | 6/2009 | Ji et al. | 455/517 |
| 2009/0201877 A1* | 8/2009 | Noh et al. | 370/330 |
| 2011/0044287 A1* | 2/2011 | Park et al. | 370/331 |
| 2011/0096752 A1* | 4/2011 | Yuk et al. | 370/331 |

FOREIGN PATENT DOCUMENTS

KR   10-2008-0104518 A   12/2008

* cited by examiner

*Primary Examiner* — Min Jung
(74) *Attorney, Agent, or Firm* — Jefferson IP Law, LLP (57) ABSTRACT

A method and an apparatus for reducing a handover delay in a broadband wireless communication system are provided. In a method for operating a terminal to reduce a handover delay in a broadband wireless communication system, a handover procedure is performed with a serving Base Station (BS) to obtain a dedicated ranging code and a Connection ID (CID). The dedicated ranging code is transmitted to one or more target BSs using the CID. Whether the dedicated ranging code is received is determined. Therefore, a handover delay and a chance of malfunction can be reduced.

22 Claims, 6 Drawing Sheets

APPARATUS AND METHOD FOR REDUCING HANDOVER DELAY IN BROADBAND WIRELESS COMMUNICATION SYSTEM

PRIORITY

This application claims the benefit under 35 U.S.C. §119 (a) of a Korean patent application filed in the Korean Intellectual Property Office on Feb. 20, 2008 and assigned Serial No. 10-2008-0015180, the entire disclosure of which is hereby incorporated by reference.

BACKGROUND OF THE INVENTION

1. Field of the Invention

The present invention relates to a handover in a broadband wireless communication system. More particularly, the present invention relates to a method and an apparatus for reducing a handover delay in a broadband wireless communication system.

2. Description of the Related Art

Figure 1:
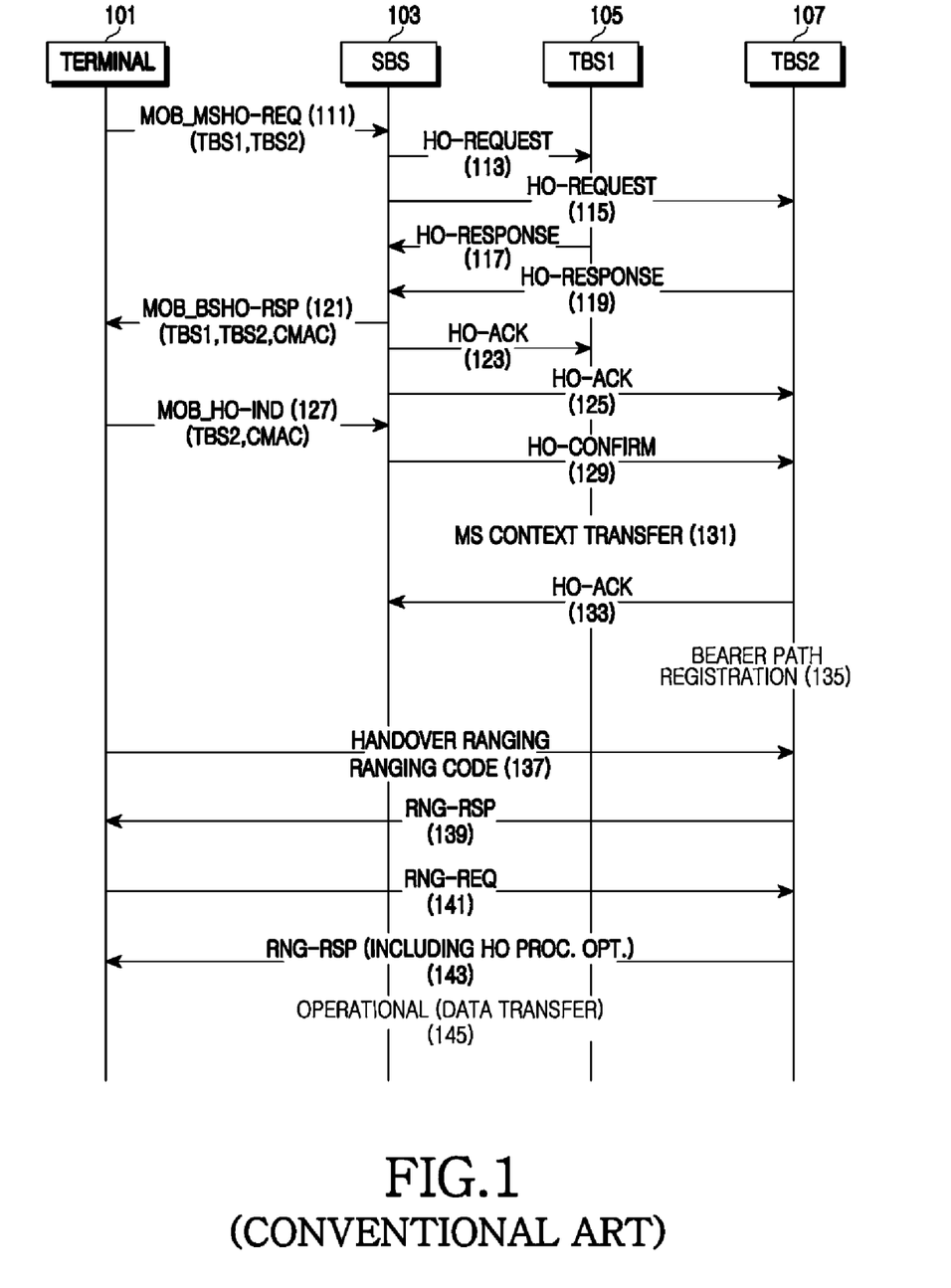
FIG. 1 is a view illustrating a handover flow in a conventional broadband wireless communication system.

A broadband wireless communication system, such as a system based on the Institute of Electrical and Electronics Engineers (IEEE) 802.16e standard, performs a handover in order to support mobility of a terminal. A conventional handover procedure in the broadband wireless communication system is illustrated in FIG. 1. In FIG. 1, it is assumed that a terminal is connected with a Serving Base Station (SBS), and that the terminal receives a broadcast message from the SBS to perform a ranging or scanning procedure on Target Base Stations (TBSs).

Referring to FIG. 1, a terminal 101 transmits an MOB_M-SHO-REQ message to the SBS 103 that the terminal 101 is in communication with in order to initiate a handover in step 111. The MOB_MSHO-REQ message includes information about TBS1 105 and TBS2 107 to which the terminal 101 is to establish communications with by performing a handover.

After receiving the MOB_MSHO-REQ message, the SBS 103, in steps 113 and 115, transmits an HO-Request message to TBS1 105 and TBS2 107 to which the terminal 101 is to handover. TBS1 105 and TBS2 107 each determine whether to allow a handover of the terminal 101, and each respond using an HO-Response message in steps 117 and 119. The SBS 103, in step 121, transmits an MOB_BSHO-RSP message to the terminal 101 in response to handover responses of TBS1 105 and TBS2 107. The MOB_BSHO-RSP message includes lists of TBSs with which the handover can be performed, and Cipher-based Message Authentication Code (CMAC) information for confirming integrity of the MOB_BSHO-RSP message. In addition, the SBS 103, in steps 123 and 125, transmits an HO-ACK associated with the HO-Response message to each of TBS1 105 and TBS2 107.

After terminal 101 receives the MOB_BSHO-RSP message, it informs the SBS 103 of the TBS with which the handover is to be performed using a MOB_HO-IND message in step 127, and performs the handover. The MOB_HO-IND message includes CMAC information for confirming integrity of the MOB_HO-IND message.

After SBS 103 receives the MOB_HO-IND message, it transmits an HO-confirm message informing of the handover of the terminal 101 to the TBS2 107 in step 129, transfers context information of the terminal 101 in step 131, and responds using an HO-ACK message in step 133. The context information of the terminal 101 may be a parameter group of the terminal. After TBS2 107 receives information about the terminal 101 from the SBS 103, the TBS2 107 performs a bearer path registration procedure in order to accurately transmit data in step 135.

Meanwhile, the terminal performs handover ranging on the TBS2 107 in step 137. In step 137, a ranging code to be transmitted is randomly selected from a handover ranging code group, and transmitted. After TBS2 107 receives the ranging code, it transmits, to the terminal 101, a physical channel correction value, etc. by transmitting an RNG-RSP message to the terminal 101, and assigns a resource through a UL-MAP to allow the terminal 101 to transmit an RNG-REQ message in step 139. The terminal 101 transmits an RNG-REQ message using the assigned resource in step 141. After the TBS2 107 has received the RNG-REQ message, it responds using an RNG-RSP message in step 143. Thereafter, normal data transmission is performed between the terminal 101 and the TBS2 107 in step 145.

However, a conventional handover procedure has a limitation that a handover delay may be generated due to code collisions between terminals that are simultaneously attempting a handover, and an additional procedure, such as those described above in steps 137 to 143, after a handover initiates.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for reducing a handover delay generated due to code collisions between terminals and an additional ranging procedure in a broadband wireless communication system.

In accordance with an aspect of the present invention, a method for operating a terminal to reduce a handover delay in a broadband wireless communication system is provided. The method includes performing a handover procedure with a serving Base Station (BS) to obtain a dedicated ranging code and a Connection ID (CID), transmitting the dedicated ranging code to one or more target BSs using the CID, and determining whether the transmitted dedicated ranging code is received.

In accordance to with another aspect of the present invention, a method for operating a target BS to reduce a handover delay in a broadband wireless communication system is provided. The method includes informing a serving BS of whether a handover is allowed in response to a handover request of a terminal, being informed of the handover of the terminal by the serving BS, receiving a dedicated ranging code from the terminal, and generating and transmitting a map message regarding reception of the dedicated ranging code.

In accordance with yet another aspect of the present invention, a terminal for reducing a handover delay in a broadband wireless communication system is provided. The terminal includes a handover controller for performing a handover procedure with a serving BS to obtain a dedicated ranging code and a CID, a ranging controller for transmitting the dedicated ranging code to one or more target BSs using the CID, and a message processor for determining whether the dedicated ranging code is received.

In accordance with still another aspect of the present invention, a target BS for reducing a handover delay in a broadband wireless communication system is provided. The BS includes a handover processor for informing a serving BS of whether a handover is allowed in response to a handover request of a terminal, and for being informed of a handover of the terminal by the serving BS, a ranging processor for receiving a dedicated ranging code from the terminal, and a message generator for informing of reception of the dedicated ranging code using a map message.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method and an apparatus for reducing a handover delay in a broadband wireless communication system.

Figure 2:
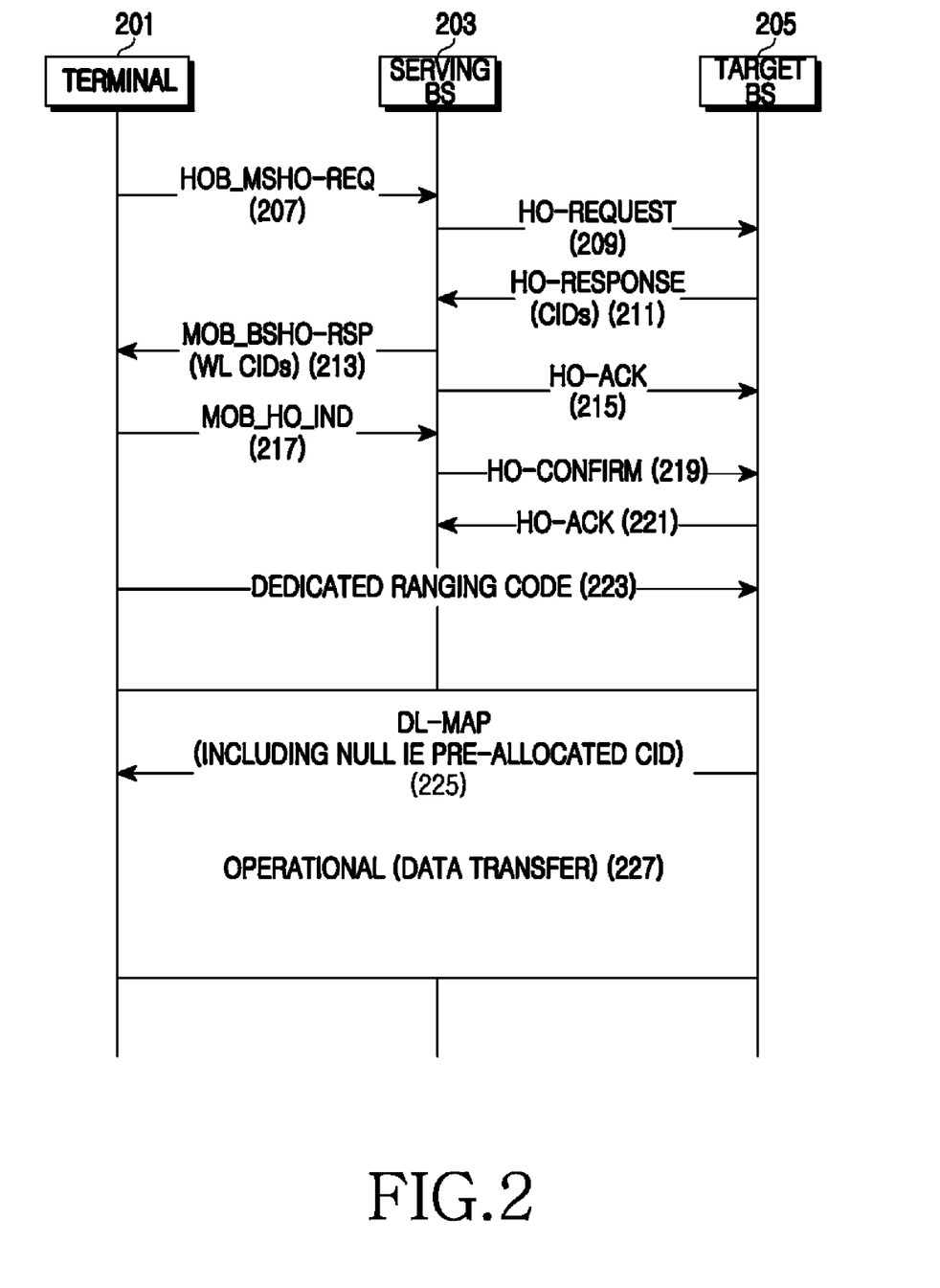
FIG. 2 is a view illustrating a handover flow in a broadband wireless communication system according to an exemplary embodiment of the present invention.

FIG. 2 is a view illustrating a handover flow in a broadband wireless communication system according to an exemplary embodiment of the present invention.

Referring to FIG. 2, when a terminal 201 transmits a handover request to a serving BS 203 in step 207, the serving BS 203 transmits a handover request to a target BS 205 with which the terminal 201 is to perform a handover in step 209. At this point, the target BS 205 transmits a message including update Connection IDs (CIDs) and a dedicated ranging code to the serving BS 203 in step 211. The update CIDs and the dedicated ranging code are determined through prior negotiation between the serving BS 203 and the target BS 205. Here, the update CIDs are CIDs updated such that the CIDs that have been used by the terminal 201 can be used by the target BS 205, and the dedicated ranging code is a code for identifying the terminal 201 when the terminal 201 tries to access a network again through the target BS 205.

The serving BS 203 then allocates the update CID and the dedicated ranging code to the terminal 201 during a handover negotiation procedure in step 213. In addition, the serving BS 203 transmits an HO-Ack message associated with the HO-Response message to the target BS 205 in step 215. Meanwhile, the terminal 201 informs the serving BS 203 of the initiation of the handover in step 217, and performs a code-based ranging on the target BS 205 using the dedicated ranging code allocated by the serving BS 203 in step 223. Meanwhile, the serving BS 203 informs the target BS 205 of the terminal's handover in step 219, and is informed by the target BS 205 of whether an HO-confirm message has been received in step 221. Before performing the handover, the terminal 201 receives, in advance, the update CID and the dedicated ranging code to be used in steps 211 and 213, and transmits the dedicated ranging code to the target BS when performing the handover in step 223. Here, the target BS 205 can recognize a handover request of the terminal 201 by receiving the dedicated ranging code. If the dedicated ranging code is not received, the target BS 205 may not recognize the handover request of the terminal 201.

When the target BS 205 cannot recognize the handover request of the terminal 201 and downlink data of the terminal 201 exists, the target BS 205 may not be able to transmit the data until the terminal 201 performs the handover. Accordingly, a delay may result. In addition, when UpLink (UL) data of the terminal 201 exists, the terminal 201 makes a resource request in order to transmit the data after the handover. However, since the target BS 205 may not recognize the handover of the terminal 201, a malfunction may occur.

To address this limitation, the target BS 205 that has received the dedicated ranging code informs of successful reception of the dedicated ranging code as described hereafter. An exemplary embodiment corresponds to a case where no downlink data exists. In this case, the target BS 205 informs of the successful reception using a DownLink (DL)-MAP Information Element (IE) inside a DL-MAP despite there not being any data in step 225. At this point, a CID field inside the DL-MAP confirms that the dedicated ranging code has been successfully received by using the CID allocated in steps 211 and 213, which are steps that occur before a handover. In addition, the handover is completed by setting an allocated resource amount to zero so that no more data may be transmitted. After that, normal data transmission/reception can be performed in step 227.

On the other hand, when the dedicated ranging code is not successfully received, the target BS 205 may not generate the DL-MAP IE. At this point, the terminal 201 operates a separate timer after transmitting the dedicated ranging code, and can reduce the chance of a malfunction by re-transmitting the dedicated ranging code or transmitting a random ranging code (not shown) when DL-MAP IE is not received within a predefined time.

Figure 3:
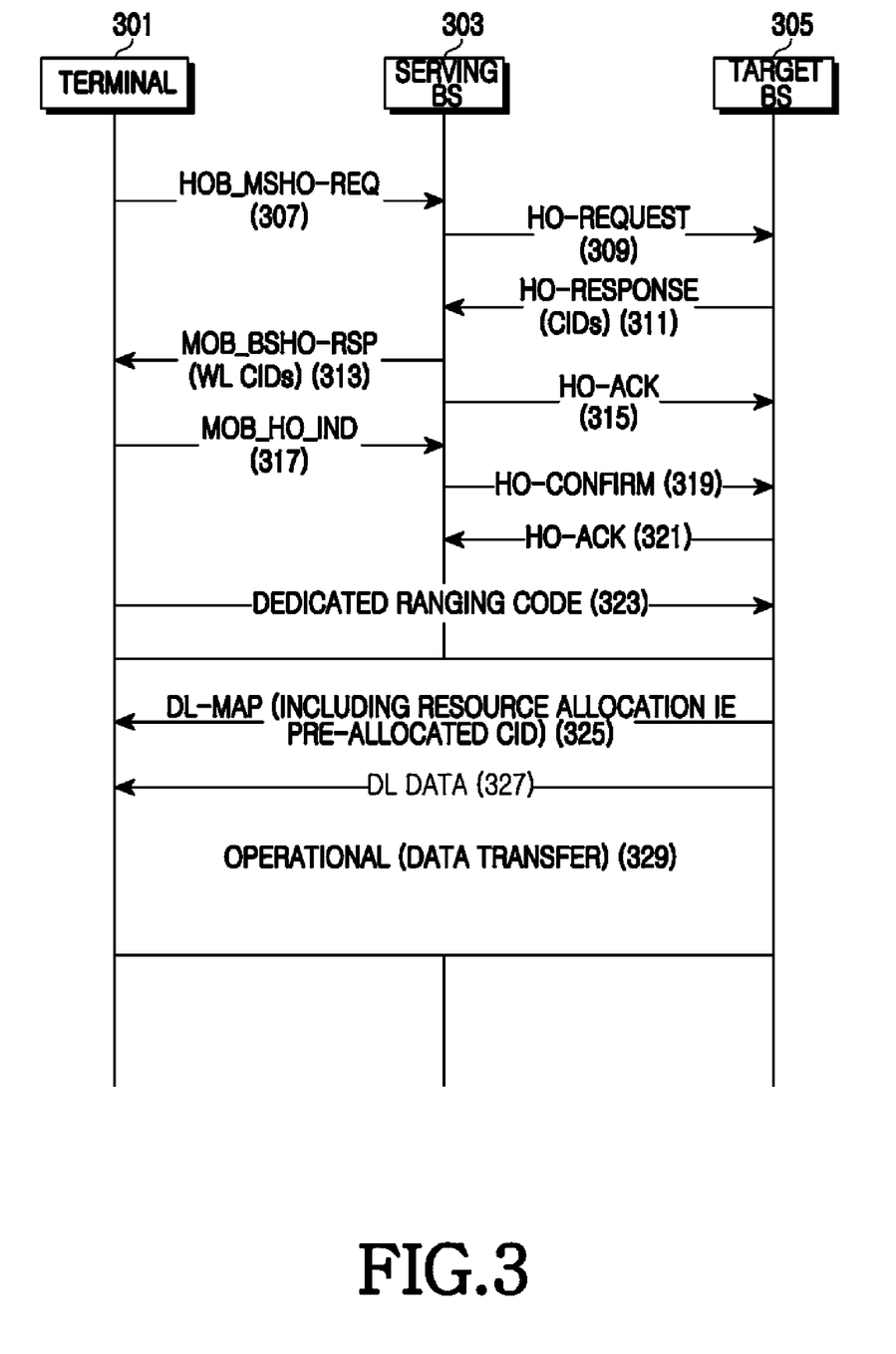
FIG. 3 is a view illustrating a handover flow in a broadband wireless communication system according to another exemplary embodiment of the present invention.

FIG. 3 is a view illustrating a handover flow in a broadband wireless communication system according to another exemplary embodiment of the present invention.

Referring to FIG. 3, since steps 307 to 323 are the substantially similar to steps 207 to 223 of FIG. 2, descriptions of steps 307 to 323 are omitted.

As in FIG. 2, before performing a handover, a terminal 301 receives in advance a CID and a dedicated ranging code to be used in steps 311 and 313), and then transmits the dedicated ranging code to a target BS 305 when performing the handover in step 323.

After the target BS 305 receives the dedicated ranging code, it uses the following technique in order to inform of successful reception of the dedicated ranging code. Another exemplary embodiment corresponds to a case where there exists downlink data after step 323. In this case, the target BS 305 allocates a resource through a DL-MAP in step 325, and transmits downlink data in step 327. Thereafter, data transfer may occur in step 329. As in the previous exemplary embodiment, a CID allocated before the handover is used for a DL-MAP IE in a DL-MAP, and the CID allocated before the handover is used for a header of downlink data, so that the terminal 301 can recognize that the dedicated ranging code has been successfully received by the target BS 305.

On the other hand, when the dedicated ranging code is not successfully received, the target BS 305 may not generate a DL-MAP IE. At this point, the terminal 201 operates a separate timer after transmitting the dedicated ranging code, and can reduce the chance of a malfunction by re-transmitting the dedicated ranging code or transmitting a random ranging code when a DL-MAP IE is not received within a predefined time.

Though the above exemplary embodiments use a dedicated ranging code, an authentication method may be additionally required in order to discriminate the terminal 301 from other terminals. For this purpose, information such as Cipher-based Message Authentication Code (CMAC) included in an additional management message, or a message for authentication can be transmitted/received after a handover.

Figure 4:
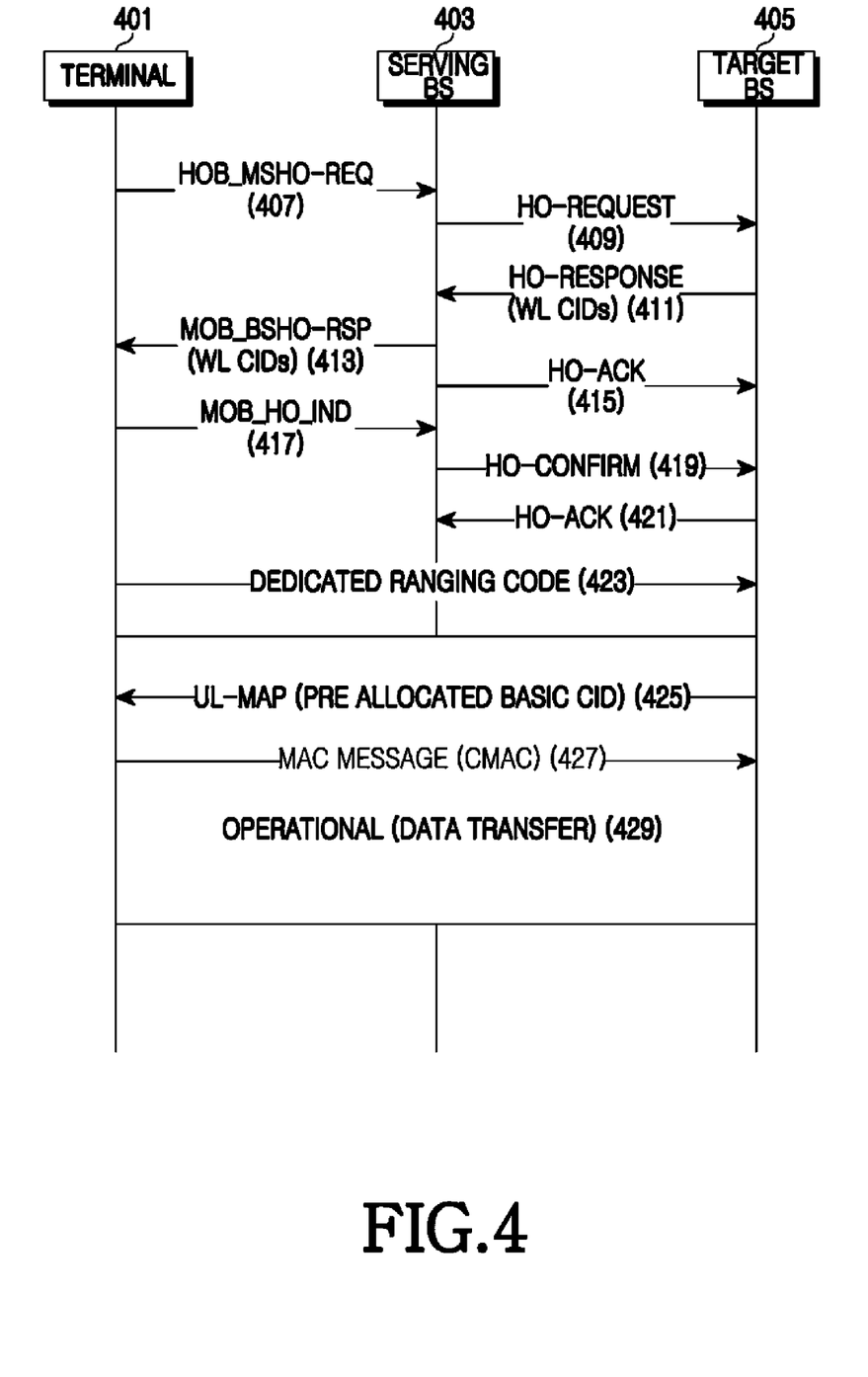
FIG. 4 is a view illustrating a handover flow in a broadband wireless communication system according to still another exemplary embodiment of the present invention.

FIG. 4 is a view illustrating a handover flow in a broadband wireless communication system according to still another exemplary embodiment of the present invention.

Referring to FIG. 4, since steps 407 to 423 are the substantially similar to steps 207 to 223 of FIG. 2, descriptions of steps 407 to 423 are omitted.

Before performing a handover, a terminal 401 receives, in advance, a CID and a dedicated ranging code to be used in steps 411 and 413, and then transmits the dedicated ranging code to a target BS 405 when performing the handover in step 423.

In order to inform of successful reception of the dedicated ranging code, the target BS 405 that has received the dedicated ranging code assigns a bandwidth using a CID determined in advance with the terminal 401 so that the terminal 401 may transmit a message including a CMAC through a UL-MAP IE. After the terminal 401 transmits the dedicated ranging code assigned in advance to the target BS 405 in step 425, the terminal 401 confirms that the target BS 405 has received the dedicated ranging code by confirming that the UL-MAP IE using the CID determined in advance is included in the UL-MAP transmitted from the target BS 405. In addition, unlike in the previous exemplary embodiments, the terminal 401 can additionally perform an authentication function by transmitting a message including a CMAC in step 427. Thereafter, data transfer may occur in step 429.

On the other hand, when the dedicated ranging code is not successfully received, the target BS 405 does not generate a UL-MAP IE. At this point, the terminal 401 operates a timer after transmitting the dedicated ranging code, and can reduce a chance of a malfunction by re-transmitting the dedicated ranging code or transmitting a random ranging code when UL-MAP IE is not received within a predefined time.

Figure 5:
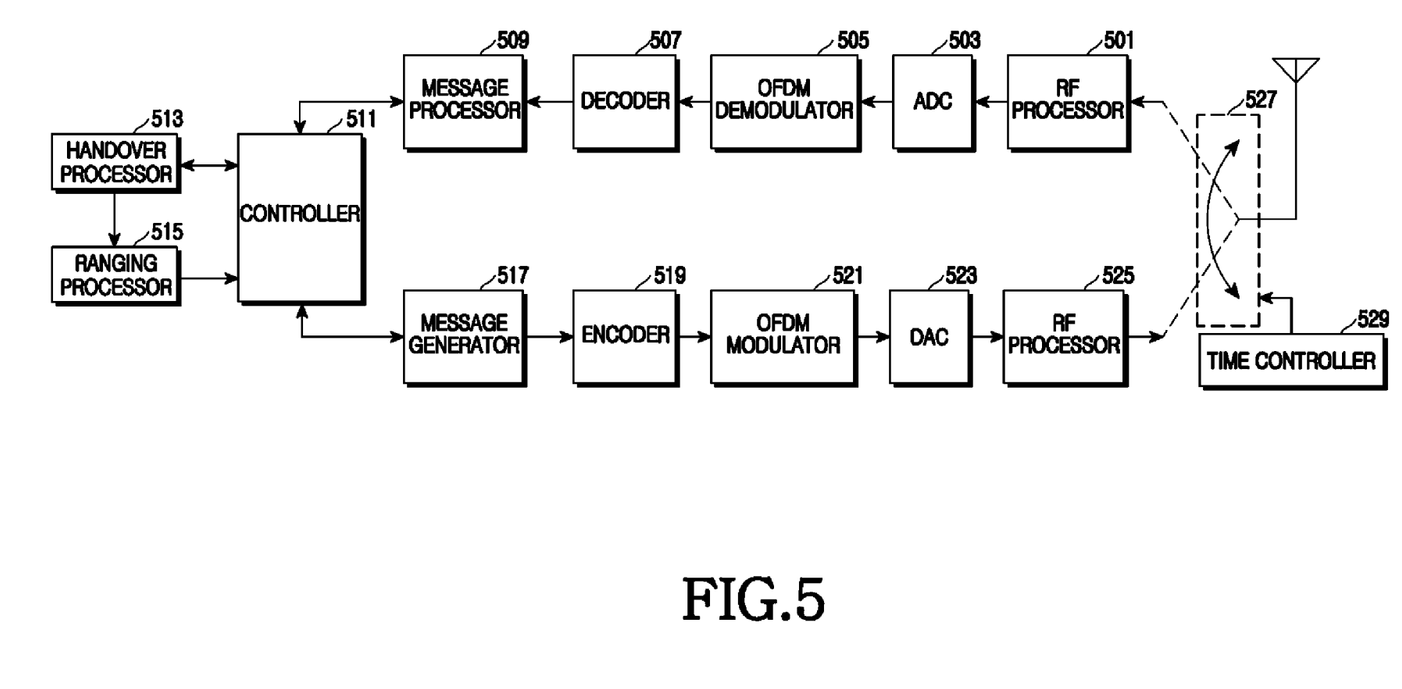
FIG. 5 is a block diagram illustrating a base station for reducing a handover delay according to an exemplary embodiment of the present invention.

FIG. 5 is a block diagram illustrating a base station for reducing a handover delay according to an exemplary embodiment of the present invention.

As illustrated in FIG. 5, the base station includes a Radio Frequency (RF) processor 501, an Analog/Digital Converter (ADC) 503, an Orthogonal Frequency Division Multiplexing (OFDM) demodulator 505, a decoder 507, a message processor 509, a controller 511, a handover processor 513, a ranging processor 515, a message generator 517, an encoder 519, an OFDM modulator 521, a Digital/Analog Converter (DAC) 523, an RF processor 525, a switch 527, and a time controller 529.

The time controller 529 controls a switching operation of the switch 527 based on frame synchronization. For example, during a time period when a signal is received, the time controller 529 controls the switch 527 such that an antenna and the RF processor 501 of a reception terminal are coupled to each other. In addition, during a time period when a signal is transmitted, the time controller 529 controls the switch 527 such that the antenna and the RF processor 525 are coupled to each other.

During the reception time period, the RF processor 501 down-converts RF signals received through the antenna into baseband analog signals. The ADC 503 converts analog signals provided from the RF processor 501 into digital signals, and outputs the same. The OFDM demodulator 505 converts the signals in a time domain provided from the ADC 503 into signals in a frequency domain by performing an FFT on the signals, and outputs the same. The decoder 507 selects data of subcarriers to be received, from data in the frequency domain provided from the OFDM demodulator 505, demodulates and decodes the selected data according to a predefined Modulation and Coding Scheme (MCS) level, and outputs the same.

The message processor 509 decomposes a control message provided from the decoder 507, and provides a result thereof to the controller 511. For example, the message processor 509 analyzes a handover message (for example, MOB_MSHO-REQ and MOB_HO-IND) received from the terminal, and provides a result thereof to the controller 511.

The controller 511 performs an overall control of the base station, and outputs handover information provided from the message processor 509 to the handover processor 513. In addition, the controller 511 informs target BSs of the terminal's handover (HO-Request message) through a backhole network, receives a HO-Response message as to whether to allow the handover, and provides a result thereof to the handover processor 513.

The handover processor 513 generates information for a handover response with reference to handover control information from the controller 511, and provides the generated information to the message generator 517. For example, the handover processor 513 provides information forming an MOB_BSHO-RSP message.

The ranging processor 515 receives handover information from the handover processor 513 to receive a dedicated ranging code transmitted by the terminal, determines an accurate timing offset allowing transmission of the terminal to be aligned at a sample time indicating a beginning of a symbol boundary, and provides the determined timing offset to the controller 511.

The message generator 517 generates a handover response message using handover control information provided from the controller 511. For example, the message generator 517 generates an MOB_BSHO-RSP message in response to the MOB_MSHO-REQ message. In addition, when the base station is a serving BS, the message generator 517 receives information from the controller 511 and generates an HO-Request message. When the base station is a target BS, the message generator 517 generates an HO-Response message. In addition, the message generator 517 receives information as to whether a dedicated ranging code has been received, from the controller 511. When the dedicated ranging code has been received, the message generator 517 generates a DL-MAP IE inside a DL-MAP, informing that the dedicated ranging code has been successfully received. On the other hand, when the dedicated ranging code has not been successfully received, the message generator 517 does not generate a DL-MAP IE.

According to still another exemplary embodiment, the message generator 517 receives information as to whether a dedicated ranging code has been received, from the controller 511. When the dedicated ranging code has been received, the message generator 517 generates a UL-MAP IE using a CID set in advance in order to inform that the dedicated ranging code has been successfully received. On the other hand, when the dedicated ranging code has not been successfully received, the message generator 517 does not generate a UL-MAP IE.

The encoder 519 encodes and modulates a signal provided from the message generator 517 according to a predefined MCS level, and outputs the same.

The OFDM modulator 521 converts the signal in a frequency output from the encoder 519 into a signal in a time domain by performing an Inverse Fast Fourier Transform (IFFT). The DAC 523 converts a sample signal provided from the OFDM modulator 521 into an analog signal, and outputs the same. The RF processor 525 up-converts a baseband signal provided from the DAC 523 into an RF signal, and transmits the RF signal via the antenna.

In the above construction, the controller 511 serves as a protocol controller, and controls the message processor 509, the message generator 517, the handover processor 513, and the ranging processor 515. That is, the controller 511 can perform the functions of the message processor 509, the message generator 517, the handover processor 513, and the ranging processor 515. The reason these elements are illustrated and described as separate elements in the exemplary embodiment of the present invention is to explain respective functions thereof. Therefore, in actual realization, these elements can be configured such that corresponding functions are processed by the controller 511. In addition, these elements can be configured such that only some of these functions are processed by the controller 511.

Figure 6:
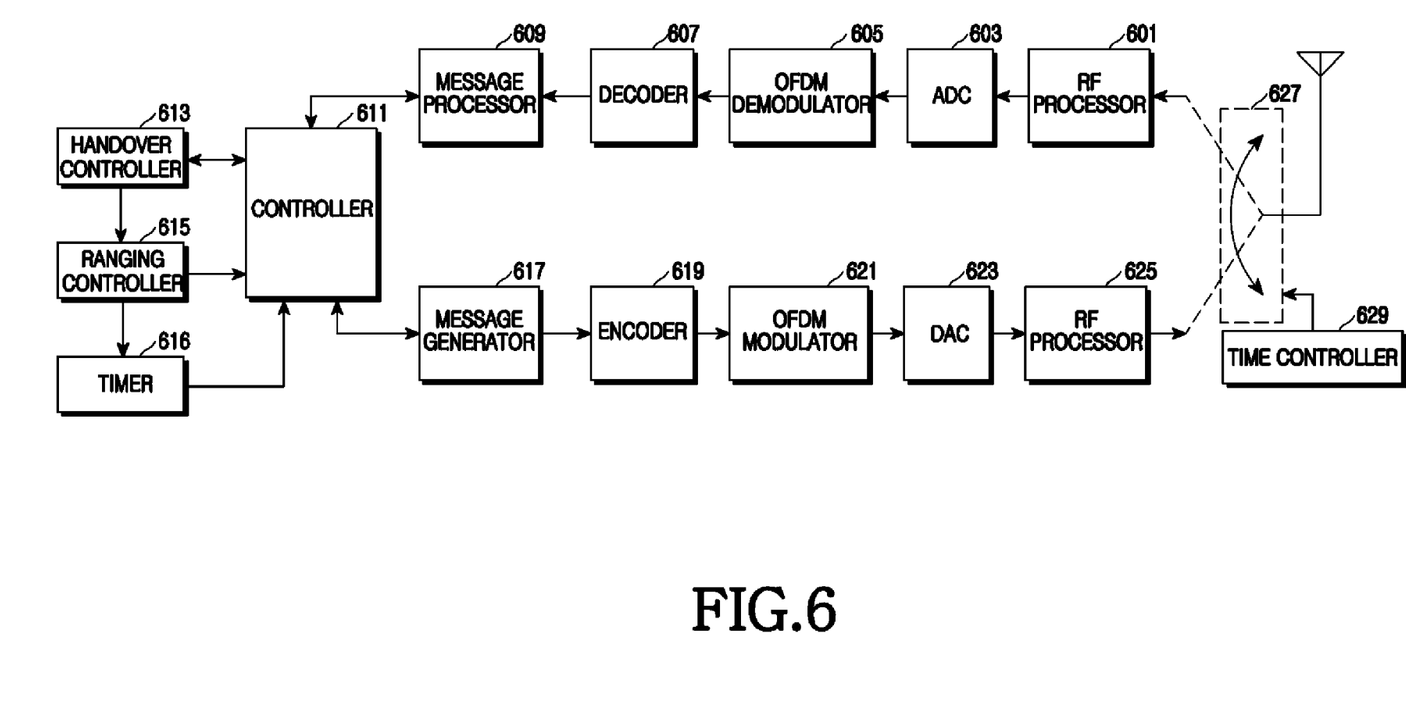
FIG. 6 is a block diagram illustrating a terminal for reducing a handover delay according to an exemplary embodiment of the present invention.

FIG. 6 is a block diagram illustrating a terminal for reducing a handover delay according to an exemplary embodiment of the present invention.

As illustrated in FIG. 6, the terminal includes an RF processor 601, an ADC 603, an OFDM demodulator 605, a decoder 607, a message processor 609, a controller 611, a handover controller 613, a ranging controller 615, a timer 616, a message generator 617, an encoder 619, an OFDM modulator 621, a DAC 623, an RF processor 625, a switch 627, and a time controller 629.

The time controller 629 controls a switching operation of the switch 627 based on frame synchronization. For example, during a time period when a signal is received, the time controller 629 controls the switch 627 such that an antenna and the RF processor 601 of a reception terminal are connected with each other. In addition, during a time period when a signal is transmitted, the time controller 629 controls the switch 627 such that the antenna and the RF processor 625 are connected with each other.

During the reception section, the RF processor 601 down-converts RF signals received through the antenna into baseband analog signals. The ADC 603 converts analog signals provided from the RF processor 601 into digital signals, and outputs the same. The OFDM demodulator 605 converts the signals in a time domain provided from the ADC 603 into signals in a frequency domain by performing an FFT on the signals, and outputs the same.

The decoder 607 selects data of subcarriers to be received, from data in the frequency domain provided from the OFDM demodulator 605, demodulates and decodes the selected data according to a predefined MCS level, and outputs the same.

The message processor 609 decomposes a control message provided from the decoder 607, and provides a result thereof to the controller 611. For example, the message processor 609 analyzes a handover message (for example, MOB_BSHO-RSP) received from the base station, and provides a result thereof to the controller 611.

The controller 611 performs an overall control of the terminal, and outputs information for performing a handover provided from the message processor 609 to the handover controller 613.

When a handover is determined to be performed, the handover controller 613 provides information for a handover request to the message generator 617, receives handover response information from the controller 611 to determine a target BS, and provides the same to the message generator 617.

The ranging controller 615 receives a dedicated ranging code generation instruction from the handover controller 613, generates a dedicated ranging code, provides the generated dedicated ranging code to the message generator 617, and informs the timer 616 of a dedicated ranging code transmission point. The dedicated ranging code is determined through prior negotiation between the terminal and the base station.

In addition, when a DL-MAP or UL-MAP message is not received from the base station for a predefined time after transmitting the dedicated ranging code, the ranging controller 615 re-transmits the dedicated ranging code, or generates a random ranging code and transmits the same.

The timer 616 operates from a point at which the dedicated ranging code is transmitted from the ranging controller 615. When the timer 616 is expired, the timer 616 informs the controller 616 that the timer 616 has expired.

The message generator 617 generates an MOB_MSHO-REQ message or generates an MOB_HO-IND message using handover control information provided from the controller 611.

The encoder 619 encodes and modulates a signal provided from the message generator 617 according to a predefined MCS level, and outputs the same. The OFDM modulator 621 converts the signal in a frequency domain provided from the encoder 619 into a signal in a time domain by performing an IFFT on the signal. The DAC 623 converts a sample signal provided from the OFDM modulator 621 into an analog signal, and outputs the same. The RF processor 625 up-converts a baseband signal provided from the DAC 623 into an RF signal, and transmits the RF signal via the antenna.

In the above construction, the controller 611 serves as a protocol controller, and controls the message processor 609, the message generator 617, the handover controller 613, the ranging controller 615, and the timer 616. That is, the controller 611 can perform the functions of the message processor 609, the message generator 617, the handover processor 613, the ranging processor 615, and the timer 616. The reason these elements are provided as separate elements in an exemplary embodiment of the present invention is to explain respective functions thereof. Therefore, in actual realization, these elements can be configured such that corresponding functions are processed by the controller 611. In addition, these elements can be configured such that only some of these functions are processed by the controller 611.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the present invention should not be limited to the above-described exemplary embodiments but should be determined by not only the appended claims but also the equivalents thereof.

As described above, exemplary embodiments of the present invention have an advantage of reducing a handover delay and reducing the chance of a malfunction by determining whether a ranging code has been received without transmitting a separate control message in a broadband wireless communication system.

What is claimed is:

1. A method for operating a terminal to reduce a handover delay in a wireless communication system, the method comprising:
    transmitting a handover request to a serving Base Station (BS);
    receiving a handover response message including a dedicated ranging code, from the serving BS, wherein the dedicated ranging code is allocated by a target BS;
    transmitting the dedicated ranging code to the target BS; and
    stopping using the dedicated ranging code if a ranging procedure is not performed successfully until an expiration of a timer.

2. The method of claim 1, wherein the dedicated ranging code comprises a code that uniquely identifies the terminal during a handover to the target BS.

3. The method of claim 1, further comprising determining of whether the dedicated ranging code is received by the target BS, wherein the determining of whether the dedicated ranging code is received comprises determining whether the dedicated ranging code is received depending on whether at least one of a DownLink (DL)-MAP and an UpLink (UL)-MAP message for resource allocation is received from the target BS.

4. The method of claim 1, further comprising receiving DownLink (DL) data from the target BS.

5. The method of claim 1, further comprising:
    selecting randomly a ranging code in a ranging code set, if the ranging procedure is not performed successfully; and
    transmitting the selected ranging code to the target BS.

6. The method of claim 1, wherein, if the target BS does not receive the dedicated ranging code before the expiration of the timer, the target BS discards a pre-assigned Connection ID (CID) of the terminal.

7. A method for operating a target Base Station (BS) to reduce a handover delay in a wireless communication system, the method comprising:
    allocating a dedicated ranging code through a serving BS, the dedicated ranging code for use with a dedicated handover ranging procedure of a terminal;
    receiving the dedicated ranging code from the terminal, if the dedicated ranging code is received before an expiration of a timer; and
    receiving a random ranging code from the terminal, if the dedicated ranging code is not received before the expiration of the timer.

8. The method of claim 7, wherein the dedicated ranging code comprises a code that uniquely identifies the terminal during a handover to the target BS.

9. The method of claim 7, further comprising determining the dedicated ranging code and a Connection ID (CID) through a prior negotiation between the target BS and the serving BS.

10. The method of claim 7, further comprising transmitting an UpLink (UL)-MAP message in order to inform of reception of the dedicated ranging code.

11. The method of claim 7, further comprising, when there is no DownLink (DL) data, transmitting a DL-MAP message without resource assignment using a Connection ID (CID) allocated in advance in order to inform of reception of the dedicated ranging code.

12. A terminal for reducing a handover delay in a wireless communication system, the terminal comprising:
    a handover controller for transmitting a handover request message to a serving Base Station (BS) and receiving a handover response message including a dedicated ranging code, from the serving BS, wherein the dedicated ranging code is allocated by a target BS; and
    a ranging controller for transmitting the dedicated ranging code to the target BS and stopping using the dedicated ranging code if a ranging procedure is not performed successfully until an expiration of a timer.

13. The terminal of claim 12, wherein the dedicated ranging code comprises a code that uniquely identifies the terminal during a handover to the target BS.

14. The terminal of claim 12, further comprising a message processor for determining whether the dedicated ranging code is received according to whether at least one of a DownLink (DL)-MAP and an UpLink (UL)-MAP message for resource allocation is received from the target BS.

15. The terminal of claim 12, further comprising a receiver for receiving DownLink (DL) data from the target BS.

16. The terminal of claim 12, wherein the ranging controller selects randomly a ranging code in a ranging code set if a the ranging procedure is not performed successfully, and transmits the selected ranging code to the target BS.

17. The terminal of claim 12, wherein if the target BS does not receive the dedicated ranging code before the expiration of the timer, the target BS discards a pre-assigned Connection ID (CID) of the terminal.

18. A target Base Station (BS) for reducing a handover delay in a broadband wireless communication system, the BS comprising:

a handover processor for allocating a dedicated ranging code through a serving BS, the dedicated ranging code for use with a dedicated handover ranging procedure of a terminal; and a ranging processor for receiving the dedicated ranging code from the terminal, if the dedicated ranging code is received before an expiration of a timer, and for receiving a random ranging code from the terminal, if the dedicated ranging code is not received before the expiration of the timer.

19. The BS of claim 18, wherein the dedicated ranging code comprises a code that uniquely identifies the terminal during a handover to the target BS.

20. The BS of claim 18, further comprising a controller for determining the dedicated ranging code and a Connection ID (CID) through a prior negotiation between the BS and the serving BS.

21. The BS of claim 18, wherein the ranging processor transmits an UpLink (UL)-MAP message in order to inform of reception of the dedicated ranging code.

22. The BS of claim 18, wherein, when there is no DownLink (DL) data, the ranging processor transmits a DL-MAP message without resource assignment using a Connection ID (CID) assigned in advance in order to inform of reception of the dedicated ranging code.

* * * * *